March 22, 1960  W. THOMAS  2,929,590
STAND FOR SUPPORTING OFFICE MACHINES OR THE LIKE
Filed Aug. 6, 1957
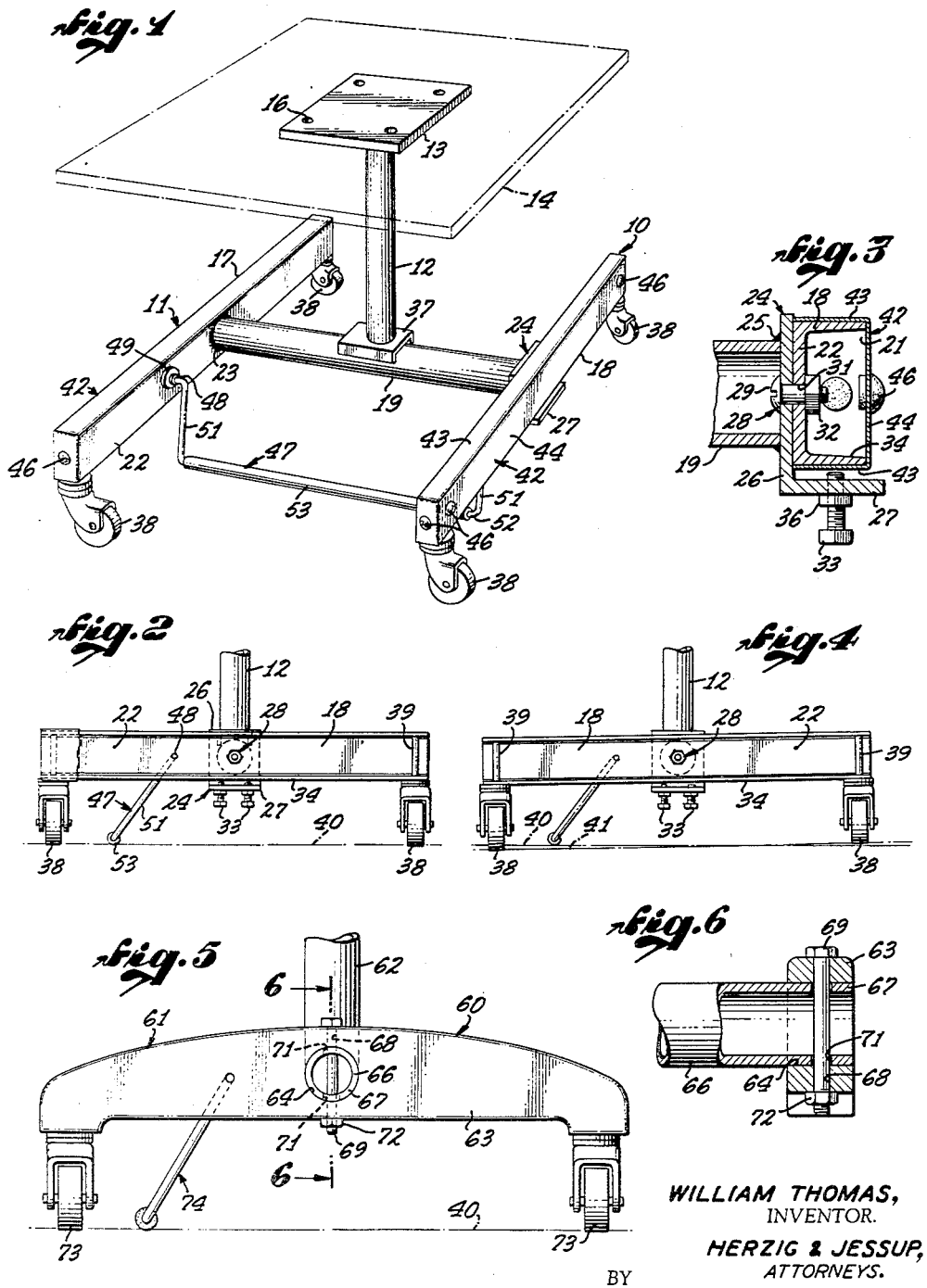
WILLIAM THOMAS,
INVENTOR.
HERZIG & JESSUP,
ATTORNEYS.
BY Albert M. Herzig United States Patent Office 2,929,590
Patented Mar. 22, 1960

2,929,590
STAND FOR SUPPORTING OFFICE MACHINES OR THE LIKE

William Thomas, Los Angeles, Calif.

Application August 6, 1957, Serial No. 676,686

9 Claims. (Cl. 248—13)

This invention relates to a stand, for supporting office machines or the like, and more particularly to a stand which incorporates, in its frame or base, means for automatically stabilizing the stand to compensate for any irregularities in the surface of the floor upon which it rests.

Machines, such as typewriters, calculators and the like, are frequently supported on stands which can be more easily transported to a desired position for use, or storage. However, the floor surface upon which such stands rest is frequently uneven or slightly irregular in portions thereof, resulting in a wobbling or rocking of the stand during use of the machine.

Therefore, it is an object of this invention to provide a new and improved stand for supporting machines or the like, which provides means for supporting a table top upon which an office machine or the like may rest, in a non-rocking, non-wobbling stable state regardless of any irregularities formed in the floor surface upon which the stand rests.

Adjusting devices in the legs of stands have been heretofore devised to compensate for such irregularities, but such devices have necessitated adjustment each time the stand is moved to a new position.

It is therefore a further object of this invention to provide a new and improved stand which automatically adjusts itself to any such irregularities of the floor surface upon which it rests.

Another object of this invention is to provide a stand of the character described which provides improved means incorporated in the base thereof for automatically adjusting itself to irregularities of the floor surface upon which it rests, and which further provides adjustment means incorporated therein for limiting the tilting action of the base in order that the stand may be lifted from the floor surface and still have the component parts of the base restrained against undue rotation.

A still further object of this invention is to provide a stand, as described, which is provided with a plurality of wheels or rollers to increase the versatility of the stand for transportability from one place to another, while still retaining the ability to automatically adjust itself to any irregularity in the floor surface during the movement thereof or after it has been moved.

A still further object of this invention is to provide a new and improved stand which is economical to manufacture, and is capable of mass production and interchangeability of parts thereof.

A general object of this invention is to provide a new and improved stand which overcomes the disadvantages of prior means and methods heretofore intended to accomplish generally the same purposes.

These and other objects will be more apparent to one skilled in the art from the following description of the drawings and appended claims.

In general, this invention includes a base for an office machine stand, which is generally of an H-shaped configuration, having elongated longitudinal members and a transverse member. The transverse member is non-rotatably fixed to one of the longitudinal members, and rotatably mounted on the other longitudinal member. A standard or pedestal is fixed to the transverse member and extends upwardly therefrom and is provided at its upper end with support means, in the form of a plate or the like, to which a table top of any suitable size or configuration may be attached.

The base member is provided with a plurality of caster wheels at the extremities of the elongated members, and if desired, means for arresting movement of the stand as on the caster wheels may be provided. If any surface irregularity in the floor upon which the stand is placed is present, the rotatably mounted elongate member rotates about the pivot point, at the point of attachment to the transverse member, to compensate for any such irregularities, while the other elongate member and consequently the standard, assume a position determined by the rest of the floor surface.

The base therefore assumes a three-point contact with the floor surface, two of the contacts being formed by the two caster wheels of the fixed elongated member, the other contact being made by the assumed position of the two caster wheels on the tiltable elongate member.

Two embodiments of this invention are illustrated; the first having a transverse member pivotally connected to one of the elongated members as by a bracket fixed to the end of the transverse member, the second embodiment having a transverse member extending through one of the elongated members, pivotally mounted therein, and having means for limiting the rotation.

In the drawings:

Fig. 1 is a perspective view, in elevation, of a preferred embodiment of a stand for office machines or the like in accordance with this invention;

Fig. 2 is a fragmentary side view, of the lower portion of the stand;

Fig. 3 is an enlarged vertical sectional view as taken on a line 3—3 of Fig. 2;

Fig. 4 is a fragmentary side view, in elevation, similar to Fig. 2, showing the base in a tilted position, conforming to an irregularity in a floor surface;

Fig. 5 is a fragmentary side view, similar to Fig. 2, of another embodiment of this invention; and Fig. 6 is an enlarged fragmentary vertical sectional view as seen on a line 6—6 of Fig. 5.

Referring more particularly to the drawings and specifically to Figs. 1–4, there is shown by way of illustration, but not of limitation, an office machine stand designated generally by the reference numeral 10, comprising a substantially horizontal base 11, a vertical standard 12 extending upwardly therefrom, and support means 13. The support 13 is fixed on the upper end of the standard by welding or the like for supporting a table top 14 or the like, shown in broken lines. The table top may be of any desired configuration, and may be attached to the support means 13 by bolts, rivets, or the like (not shown), extending through apertures 16.

The base 11 is preferably of an H-shaped configuration, and includes a pair of spaced, substantially parallel, elongate longitudinal members 17, 18, and a transverse member 19 corresponding to the cross bar of the letter H. Such a configuration advantageously provides ample leg room for an operator while in a sitting position.

The elongated members 17, 18, may be of any desired cross section, and are herein illustrated as comprising channel sections with open faces 21 facing outwardly, and vertical walls 22 facing inwardly. The transverse member 19 is secured to an intermediate portion of the inwardly facing wall 22 of the longitudinal member 17 as by welding, or the like, indicated at 23. The other end of the transverse member 19 is provided with an L-shaped bracket 24 welded thereto as indicated at 25. The bracket 24 has a vertical leg 26, to which the transverse member 19 is welded, and an outwardly extending horizontal leg or flange 27.

A pivot means 28 is provided in the bracket 24, and may include a bolt or stud 29 extending from the vertical leg 26 of the bracket and outwardly through an aperture 31 in the intermediate portion of the longitudinal member 18 to mount said member rotatably thereon. A nut and washer 32 may be provided to secure the member 18.

As may be clearly understood from the foregoing description, the base is formed of a pair of longitudinal members 17, 18, and a transverse member 19. The transverse member is fixed at one end thereof to the member 17, and rotatably mounted at the other end thereof to the longitudinal member 18.

The outwardly extending flange 27 of the bracket 24 underlies the longitudinal member 18 and is spaced therefrom. A pair of set screws 33 are provided in the flange 27 extending therethrough into proximity with a lower horizontal portion 34 of the longitudinal member 18. The set screws 33 are preferably provided, one on each side of the vertical axis of the pivot means 28, and may be threadedly extended inwardly or outwardly to adjust the spacing between the upper end of the set screws and the lower leg 34 of the member 18, as desired, to limit the rotation of the member 18 about the pivot means 28. Lock nuts 36 are preferably provided for each set screw to lock the set screw in a desired adjustment.

The standard 12 is secured to the transverse member 19 as by a bracket 37 welded thereto, or may optionally be welded directly to the transverse member.

To facilitate moving of the stand, caster wheels 38 are provided at the ends of each longitudinal member 17, 18. The caster wheels have stems 39 extending through the horizontal legs of the longitudinal members 17 and 18, and may be retained therein in any suitable manner.

As best seen in Fig. 2, if the floor surface 40 upon which the stand rests is level, the longitudinal member 18 will assume a position substantially at a right angle to the standard 12 of the stand 10. If, however, a portion of the floor surface indicated at 41 in Fig. 4 is inclined or otherwise irregular, the longitudinal member 18 will assume a position dictated by the irregularity, while the longitudinal member 17 is still parallel to the floor surface 40, retaining the standard 12 in a vertical position. Thus, the longitudinal member 18 may rotate freely about the pivot point 28 to provide a firm contact of the caster wheels 38 attached thereto, while the caster wheels 38 of the member 17 are also in contact with the floor, eliminating any rocking or tilting of the table during its use. The set screws 33 are preferably adjusted to clear the bottom leg 34 of the longitudinal member 18 sufficiently to permit sufficient rotation of the longitudinal member 18 as required by the irregularity. If, however, the table is lifted, the set screws 33 limit the rotation of the member 18 to avoid excessive rotation whereby one of the wheels 38 might possibly drag on the floor surface as the table is being lifted or carried, or completely rotate about the pivot point and have one of its ends facing downwardly, making it difficult to reset the table on a surface or lift over any objects if such objects are in the path of the transportation.

If a channel member as described is used for the longitudinal members 17, 18, it is preferable to provide covers indicated by the numeral 42. The covers 42 include horizontal flanges 43 and a front face 44 to telescope with the channel members and enclose the open faces 21 thereof. If desired, bumpers indicated at 46 may be provided adjacent the corners of the cover to avoid scratching or marring other furniture while the table is being transported from one place to another.

Means for arresting the movement of the stand is preferably provided, to avoid movement of the stand while it is being used. For this purpose, a U-shaped member 47, having outwardly turned ends 48 is rotatably mounted on the base 11. The ends 48 extend into bushings 49 spaced outwardly from the transverse member 19. The U-shaped bracket 47 includes substantially parallel depending portions 51 adjacent the outwardly extending ends 48 and a transverse portion 52. The depending portion 51 is preferably of a dimensional length longer than the distance between the end 48 and the bottom surface of the caster wheels 38, i.e., the floor surface 40.

A resilient cover or tubing 53 is provided on the transverse portion 52 of the bracket 47. As the machine stand is transported from one place to another, the bracket 47 is free to pivot on its ends 48 and offer little or no drag to the stand. When the stand is in a desired location, the operator arranges the stand so that the bracket 47 is in the proximity of his feet. As the operator uses the machine on the stand, he may place a foot on the transverse member 52 to keep the table from rolling on its caster wheels 38. Thus, a simple means for retaining the stand in an immobile position, is provided.

Referring to Figs. 5 and 6, there is shown another embodiment of this invention indicated generally by the reference numeral 60, including a base 61, and a standard 62, generally similar to the base 11 and standard 12 of the first embodiment. The base 61 includes a pair of substantially parallel spaced longitudinal members, one of which is indicated at 63. Each member 63 may be of hollow or solid cross section, and includes a bore 64 extending horizontally through an intermediate portion thereof.

A cross-arm 66 is disposed transversely of the members 63, with its ends 67 extending into the bores 64 and residing therein. One of these ends, not shown, is non-rotatably secured in one of the longitudinal members 63, similarly to the connection 23 between the transverse member 19 and longitudinal members 17 of the first embodiment. The other end 67, illustrated herein, has a sliding fit with the bore 64 of the other longitudinal member 63 for rotation therein. A vertical reduced bore 68 is provided in the longitudinal member 63, intersecting the bore 64. A bolt, shaft, or the like, 69 is disposed in the bore 68 and extends through aligned peripheral slots or apertures 71 formed in the end 67 of the transverse member 66 and is retained therein by a nut 72.

The slots 71 are preferably large enough to permit desired rotation of the longitudinal member 63 around the end 67 of the transverse member 66, while limiting the rotation to prevent excessive rotation of the member 63 if the stand is lifted away from the floor surface 40. The standard 62 is welded or otherwise fixed to an intermediate portion of the transverse member 67 similarly to the standard 12 as attached to the transverse member 19.

To facilitate movement of the stand 60, caster wheels 73 are rotatably mounted on the ends of the longitudinal member 63 to roll on the floor surface 40. If desired, means for arresting the motion indicated by the numeral 74, similar to the bracket 47 of the first embodiment, may likewise be provided to pivot in the longitudinal members 63 to provide a gripping member which the operator may engage as by a foot to retain the stand in a desired position.

In this instant embodiment, as previously described in the first embodiment, the stand 60 provides a three-point contact with the floor surface 40, two points being made by the caster wheels 73 of the longitudinal member 63 which is fixed to the transverse member 66, the other point of contact being made by the assumed position of the two caster wheels 73 of the rotatable longitudinal member 63 shown in Fig. 5. The longitudinal member 63 is retained on the end 67 of the transverse member 66 by the bolt 69 extending through aligned apertures 68 of the member 63 and aligned slots 71 of the end 67 of the member 66. The slots 71 further serve to limit the amount of rotation of the longitudinal member 63 as herein described.

While I have herein shown and described what I conceive to be the most desirable embodiments of my invention, it is to be understood that alterations and modifications thereof may be made in a manner to satisfy the spirit of my invention which is intended to comprehend any and all equivalent devices as comprehended in the following claims.

What I claim as new and desire to secure by Letters Patent is:

1. A stand for supporting office machines or the like which comprises: a pair of longitudinal members; a transverse member having ends and an intermediate portion, one end of said transverse member being non-rotatably fixed to one of said longitudinal members; pivot means for rotatably mounting the other end of said transverse member to the other of said longitudinal members; means coacting between said transverse and said other longitudinal member for limiting the rotation of said other longitudinal member; standard means on one of said members and extending upwardly from said intermediate portion; and support means on said standard means including a table top or the like.

2. A stand in accordance with claim 1 including wheel means on said longitudinal members for transporting the stand, said longitudinal members being at a relatively low level directly over said wheels and said standard means forming a pedestal leaving unobstructed space under the table top.

3. A stand in accordance with claim 2 including a second transverse member spaced from said first transverse member and having integral outwardly extending ends, depending portions adjacent said ends and a transverse portion, said ends being rotatably mounted in said longitudinal members, said depending portions having a length greater than the vertical dimensional distance between the ends and the lower surface of said wheel means, said transverse portion selectively arresting movement of the stand when pressed against a supporting floor surface as by a foot of the operator.

4. A stand in accordance with claim 3 including resilient cover means on said transverse portion of said second transverse member, for providing a non-slipping engagement with the floor surface.

5. A stand for supporting office machines or the like which comprises: a base having a pair of substantially parallel longitudinal members and a transverse member, said transverse member having ends; one end of said transverse member being non-rotatably fixed to an intermediate portion of one of said longitudinal members, bracket means on the other end of said transverse member having a horizontal extension; pivot means on said bracket means for rotatably mounting the other of said longitudinal members about a horizontal axis of said transverse member; adjustment means on said horizontal extension cooperating with said other longitudinal member limiting rotation of said other longitudinal member; caster wheel means on said longitudinal members for transporting the stand; an upwardly extending standard means mounted on one of said members; and support means on said standard means for supporting a table top.

6. A stand for supporting office machines or the like which comprises: a pair of longitudinal members; a transverse member having ends and an intermediate portion; one end of said transverse member being non-rotatably fixed to one of said longitudinal members, means defining a horizontal bore in the other of said longitudinal members; the other end of said transverse member residing in said horizontal bore; means defining a vertical bore in said other longitudinal member and intersecting said horizontal bore, means defining aligned enlarged openings in said other end of said transverse member, said enlarged openings being in alignment with said vertical bore; fastening means extending through said vertical bore and said enlarged openings, for retaining said other end of said transverse member in said other longitudinal member, standard means on said transverse member and extending upwardly therefrom; support means on said standard means for supporting a table top or the like; and wheel means on said longitudinal members for transporting the stand.

7. A stand for supporting office machines or the like which comprises: a pair of longitudinal members; a transverse member having ends and an intermediate portion; one end of said transverse member being non-rotatably fixed to one of said longitudinal members, a means defining a horizontal bore in the other of said longitudinal members; the other end of said transverse member residing in said horizontal bore; means defining a vertical bore in said other longitudinal member and intersecting said horizontal bore, means defining aligned transverse slots in said other end of said transverse member, said slots being in alignment with said vertical bore, fastening means extending through said vertical bore and said slots for retaining said other end of said transverse member in said other longitudinal member, standard means on one of said members and extending upwardly therefrom; support means on said standard means for supporting a table top or the like; and wheel means on said longitudinal members for transporting the stand.

8. A stand as defined in claim 1 including manually operable arresting means on one of said members to be selectively engaged with a supporting surface to frictionally arrest movement of said stand thereover.

9. A stand for supporting office machines or the like which comprises: a pair of longitudinal members; a transverse member having ends and an intermediate portion; one end of said transverse member being non-rotatably fixed to one of said longitudinal members, means on the other of said longitudinal members arranged in telescoping pivoted relation to the other end of said transverse member; means defining a vertical bore in one of said telescoping members; means defining aligned enlarged openings in said other of said telescoping members, said enlarged openings being in alignment with said vertical bore; fastening means extending through said vertical bore and said enlarged openings, for retaining said telescoping members in assembled relation, standard means on one of said members and extending upwardly therefrom; support means on said standard means for supporting a table top or the like; and wheel means on said longitudinal members for transporting the stand.

References Cited in the file of this patent

UNITED STATES PATENTS

| 184,702 | Crane | Nov. 28, 1876 |
| 2,559,028 | Oberwegner | July 3, 1951 |
| 2,689,744 | Mullin | Sept. 21, 1954 |

FOREIGN PATENTS

| 663,787 | Germany | Aug. 13, 1938 |